United States Patent [19]
Murray

[11] Patent Number: 5,640,607
[45] Date of Patent: Jun. 17, 1997

[54] METHOD FOR SENDING BIT MAPPED IMAGE BY APPENDING SPECIAL CODE TO TEXT STRING AND TRANSMITTING THE TEXT STRING SEPARATELY FROM COMPRESSED RESIDUAL IMAGE

[75] Inventor: Ronald C. Murray, King County, Wash.

[73] Assignee: Microsoft Corporation, Redmond, Wash.

[21] Appl. No.: 873,406

[22] Filed: Apr. 21, 1992

[51] Int. Cl.⁶ .................................................. G06F 15/00
[52] U.S. Cl. ........................ 395/888; 358/261.1; 341/67; 382/245; 395/114
[58] Field of Search ........................ 395/114, 275, 395/800, 148, 888; 382/56, 9, 40, 10, 30, 22, 41, 48, 245; 358/406, 426, 433; 364/513, 518; 341/95, 51, 55, 87, 67, 106

[56] References Cited

U.S. PATENT DOCUMENTS

| | | | |
|---|---|---|---|
| 3,980,809 | 9/1976 | Cook | 358/433 |
| 4,013,828 | 3/1977 | Judice | 348/422 |
| 4,277,826 | 7/1981 | Collins et al. | 395/416 |
| 4,281,312 | 7/1981 | Knudson | 382/243 |
| 4,386,416 | 5/1983 | Giltner | 395/375 |
| 4,410,916 | 10/1983 | Pratt et al. | 358/433 |
| 4,463,386 | 7/1984 | Goddard et al. | 358/432 |
| 4,499,499 | 2/1985 | Brickman et al. | 358/433 |
| 4,606,069 | 8/1986 | Johnson | 382/243 |
| 4,648,069 | 3/1987 | Funk et al. | 395/463 |
| 4,703,362 | 10/1987 | Deutermann et al. | 358/263 |
| 4,769,716 | 9/1988 | Casey et al. | 358/445 |
| 4,783,841 | 11/1988 | Crayson | 382/243 |
| 4,918,624 | 4/1990 | Moore et al. | 395/114 |
| 4,922,545 | 5/1990 | Endoh et al. | 382/243 |
| 4,959,870 | 9/1990 | Tachikawa | 382/253 |
| 4,979,039 | 12/1990 | Kisor et al. | 358/133 |
| 5,109,437 | 4/1992 | Honda | 382/244 |
| 5,191,640 | 3/1993 | Plass | 395/114 |
| 5,197,117 | 3/1993 | Kato et al. | 395/114 |
| 5,207,517 | 5/1993 | Ito | 395/114 |
| 5,287,275 | 2/1994 | Kimura | 382/228 |

*Primary Examiner*—Thomas C. Lee
*Assistant Examiner*—Moustafa M. Meky
*Attorney, Agent, or Firm*—Seed and Berry LLP

[57] ABSTRACT

A method of transferring the digital representation of a bit-mapped image which includes the steps of: (1) identifying predefined patterns in the bit-mapped image data, and (2) transmitting pattern codes corresponding to those patterns to a receiving device. The identification of the patterns involves the partitioning of the bit-mapped image into a series of pattern cells and the scanning of those pattern cells to find preselected patterns. The preferred method of searching the pattern cells is based upon the use of a hashing function and hash tables. In response to the received pattern codes, the receiving device reconstructs the bit-mapped image associated with the pattern codes. After all patterns in the bit-mapped images are identified and sent to the receiving device, the non-recognized portions of the bit-mapped image are then sent. The overall bit-mapped image is recreated by combining the recognized patterns with the non-recognized portions in their original order.

4 Claims, 11 Drawing Sheets

|     |     |     |     |     |     |     |     |
| --- | --- | --- | --- | --- | --- | --- | --- |
| 1   | 2   | 3   | 4   | 5   | 6   | 7   | 8   |
| 9   | 10  | 11  | 12  | 13  | 14  | 15  | 16  |
| 17  | 18  | 19  | 20  | 21  | 22  | 23  | 24  |
| 25  | 26  | 27  | 28  | 29  | 30  | 31  | 32  |
| 33  | 34  | 35  | 36  | 37  | 38  | 39  | 40  |
| 41  | 42  | 43  | 44  | 45  | 46  | 47  | 48  |
| 49  | 50  | 51  | 52  | 53  | 54  | 55  | 56  |
| 57  | 58  | 59  | 60  | 61  | 62  | 63  | 64  |

*Fig. 7*

| 0  | 17 | 17 | 16 | 16 | 16 | 14 | *** |
|----|----|----|----|----|----|----|-----|
| 0  | 17 | 17 | 0  | 14 | 16 | 14 | *** |
| 0  | 17 | 0  | 0  | 14 | 14 | 14 | *** |
| 15 | 15 | 0  | 0  | 0  | 0  | 16 | *** |
| 0  | 0  | 0  | 0  | 0  | 0  | 16 | *** |
| *  | *  | *  | *  | *  | *  | *  |     |

Fig. 9

| 0  | 17 | 17 | 16 | 16 | 16 | 14  | *** |
|----|----|----|----|----|----|-----|-----|
| 0  | 17 | 17 | 0  | 14 | 16 | 14  | *** |
| 0  | 17 | 1  | 14 | 14 | 14 | *** |     |
| 15 | 15 | 2  | 16 | ***|    |     |     |
| 2  | 1  | 16 | ***|    |    |     |     |

Fig. 10

METHOD FOR SENDING BIT MAPPED IMAGE BY APPENDING SPECIAL CODE TO TEXT STRING AND TRANSMITTING THE TEXT STRING SEPARATELY FROM COMPRESSED RESIDUAL IMAGE

TECHNICAL FIELD

This invention relates to a method of and system for efficiently transferring bit-mapped images between devices in a computer system or the like by recognizing preselected patterns within the bit-mapped images prior to transfer.

BACKGROUND OF THE INVENTION

Many printers incorporate an imaging scheme in which the image to be reproduced is represented as an array of individual image points called "pels" (short for "picture elements"). A typical laser printer can print an 8 inch by 10 inch image at a resolution of about 300 pels per inch. Thus, on such a printer an 8 inch by 10 inch image would consist of a set of 7,200,000 pels. In the simplest case where pels are restricted to two values—Black and White—an 8 inch by 10 inch image could be represented by 900,000 eight-bit byte values. Thus, an equivalency exists between an image to be reproduced and a set of digital values. The set of digital values which represent an image, and the image produced from a set of digital values, are referred to interchangeably herein as a bit-mapped image. Color images are more complex than black and white images and require a larger number of bytes to define a set of digital values which correspond to a bit-mapped color image. For simplicity, only black-and-white bit-mapped images will be discussed herein. However, the preferred embodiment discussed herein can be easily modified for use with color bit-mapped images.

To print a bit-mapped image stored in a computer memory, that image must first be transferred from the computer to the printer along a printer interface. Personal computers typically use a printer interface that is either a serial or a parallel connection. Serial connections typically can transfer about 1920 bytes/second while parallel connections are usually 5 to 10 times faster. Ignoring any overhead in the printer's command language, a full-page bit-mapped image transferred along a serial connection might require about 470 seconds; a parallel connection might require about 95 seconds. Since many printers can print a full page within 10 seconds after they receive the bit-mapped image, the image data transfer represents a significant bottleneck.

Printers used with personal computers are usually raster printers which print according to a predetermined scan pattern. While these patterns vary from printer to printer, it will be assumed herein that scanning is left-to-right along a horizontal row, and then left to right one vertical row down, and so on. The current print position is referred to herein as the print cursor position, or simply as the cursor.

To print an image on a raster printer three pieces of information may be required: (1) the pel image data for each pel location; (2) the page coordinates for each pel; and (3) the direction in which the cursor is to move to the next pel. The pel image data is always required since it informs the printer what is to be printed at each pel. However, the page coordinates for each pel and the cursor movement direction often does not need to be specifically transmitted. The cursor movement direction is usually established by the printer manufacturer and the current page coordinate is usually kept internally by the printer during printing. Thus when printing, the printer prints a pel, moves one pel over, updates the cursor position, and associates the current cursor position with pel image data at that location. When the cursor sweeps as far to the right as permitted, or when a new row is command by the computer, the cursor position resets to the far left, one vertical row down. Thus, usually only the initial page coordinate must be sent to the printer to synchronize printing with the pel image data.

Fortunately, many raster printers have features that provide alternatives to the simple byte stream method of transmitting information. For example, printers have a default pel value—the color of the unprinted page—which need not be transmitted. For large printing gaps the image data byte stream may simply include cursor movement commands which cause the cursor position to skip over the printing gaps.

Another feature which can significantly reduce the amount of data required to print a page is the use of character fonts. A character font is a predetermined character that the printer automatically prints when it receives a predetermined set of digital values, called font character codes. A font is a set of font characters; typical examples include the well-known Pica and Elite fonts. By controlling the computer and printer such that they agree on the character represented by a font character code, and by storing information as a set of pattern codes, a page of information may rapidly be printed. Fonts are particularly useful for text since a relatively small number of characters can transfer a significant amount of information. However, fonts have not been useful with bit-mapped images since bit-mapped images are stored as an array of individual digital values and not font character codes.

Therefore, it is clear that a need has existed for a system and method for transferring bit-mapped images to a receiving device at high speed.

SUMMARY OF THE INVENTION

It is an object of the present invention to provide a method for transferring bit-mapped images at high-speed.

It is yet another object of the present invention to provide a method for transferring a bit-mapped image to a printer.

It is still another object of the present invention to provide a method of printing a bit-mapped image on a raster printer at high-speed.

These and other objects of the present invention, which will become more apparent to those of skill in the art as the inventor described more fully below, are obtained in a system for transferring digital information corresponding to a bit-mapped image from a sending to a receiving device. In a preferred embodiment, the method includes the steps of recognizing preselected patterns in the bit-mapped image and transmitting pattern codes corresponding to the preselected patterns to the receiving device, such as a printer. A bit-mapped image to be transferred is partitioned into a series of pattern cells which are scanned to identify preselected patterns. They are then associated with pattern codes which are transmitted to the identified patterns to the receiving device. The recognized patterns are cancelled from the bit-mapped image and, in response to the received pattern codes, the pattern image associated with the pattern codes are reconstructed in the memory of the receiving device. After all patterns in the bit-mapped images are sent to the receiving device, the non-recognized portions of the bit-mapped image may then be sent to the receiving device, which recomposes the original bit-mapped image by combining the recognized pattern image data with the non-recognized portions in the original images.

BRIEF DESCRIPTION OF THE DRAWINGS

FIG. 7 illustrates the correspondence between the pels of the pattern cell and numerical values input to a hashing function.

FIG. 9 shows a text string comprised of 35 pattern codes organized as an array to indicate the correspondence between the pattern cells and the bit-mapped image text string data.

FIG. 10 illustrates the method employed in the preferred embodiment described herein for reducing the text string of FIG. 9 by the use of special reserved pattern codes.

DETAILED DESCRIPTION OF THE INVENTION

The present invention is a method for the high-speed transfer of bit-mapped images from a sending to a receiving device. In a preferred embodiment, digital values corresponding to a bit-mapped image are stored in the sending device's memory. The memory is scanned to find occurrences of a predetermined set of images, referred to herein as patterns. The scanning of the bit-mapped image is assisted by dividing the complete bit-mapped image into a large number of pattern cells which are scanned for the patterns. When a pattern is recognized, a digital code which identifies that pattern, hereinafter called a pattern code, is transmitted to the receiving device. The data corresponding to the recognized pattern is preferably removed from the pattern cell so that unidentified portions of the bit-mapped image can be sent to the printer without the sending of image data corresponding to the recognized patterns. After receipt of the pattern codes, the receiving device recreates the pattern and stores the pattern image in the receiving device's memory. After all pattern cells have been searched, the residue portions in the bit-mapped memory are sent to the receiving device which recomposes the original bit-mapped image by combining the patterns and the residue image portions in their original order. The printer can then print the bit-mapped image.

Figure 1:
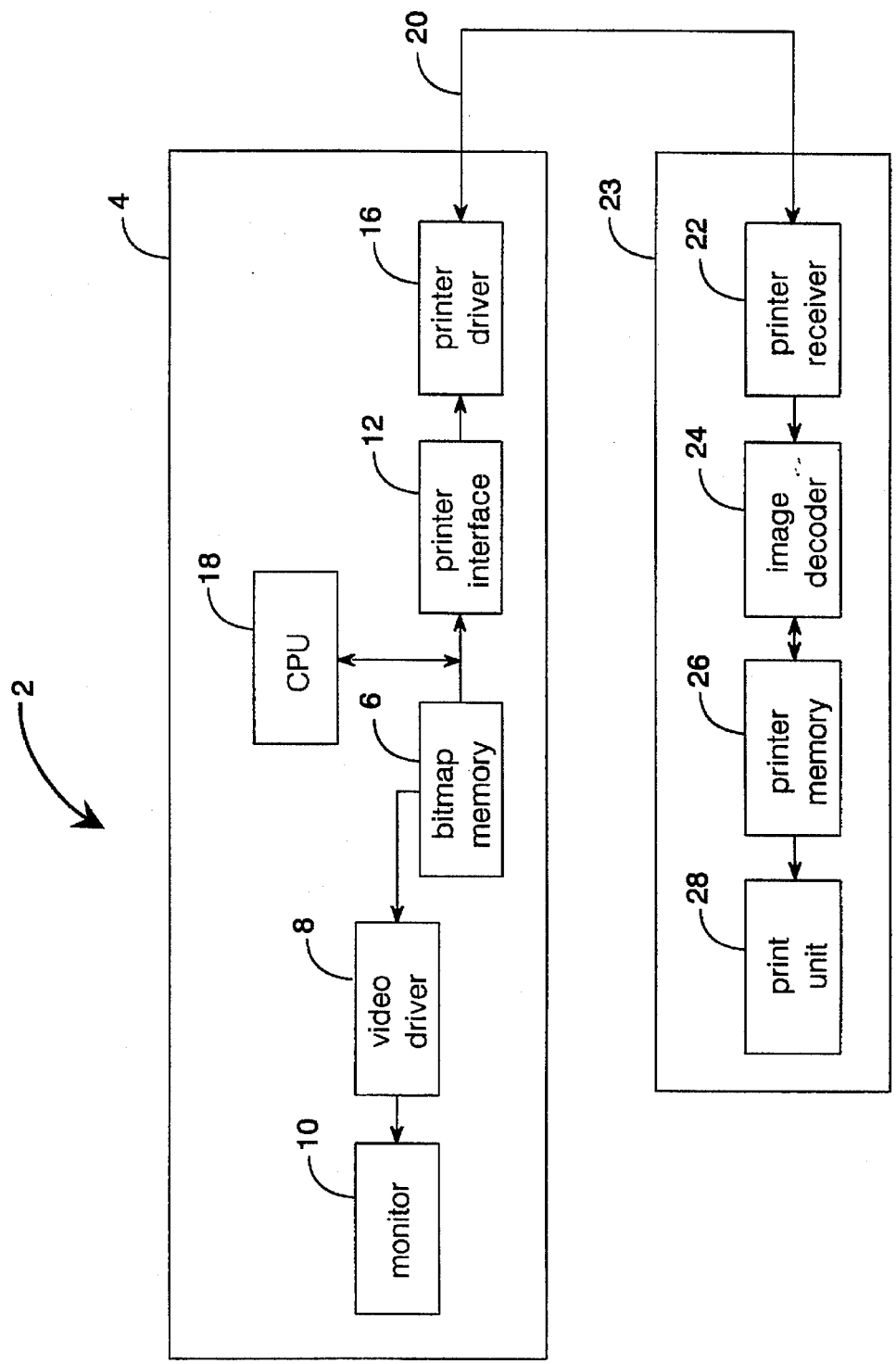
FIG. 1 is a block diagram illustrating a computer-printer system comprising a preferred embodiment of the present invention.

A preferred embodiment of the present invention is illustrated in FIG. 1, a simplified block diagram of a computer/printer network 2. A computer 4 has a memory 6 which stores a bit-mapped image comprised of digital values. The bit-mapped image may have been created by application software, a digitizer, or may be from another device. The bit-mapped image may be applied to a video driver 8 which causes the image to be displayed on a monitor 10 for viewing by an operator. The bit-mapped image may be also applied to a printer interface 12 which creates a copy of the bit-mapped image and processes the image data. Patterns contained in the bit-mapped image are identified and pattern codes corresponding to any identified patterns are transmitted to a printer driver 16. The printer interface also removes the image data corresponding to the identified patterns from the bit-mapped image copy. After all patterns have been identified, the printer interface transfers all of the residual bit-mapped image data to the printer driver 16. The operation of the computer is controlled by a central processing unit 18 under the control of a software program (not shown).

Data applied to the printer driver 16 is sent via an interface bus 20 to a printer receiver 22 in the printer 23. The printer receiver 22 receives the pattern codes and the residue bit-mapped image data and applies them to an image decoder 24. The image decoder 24 regenerates the original bit-mapped image by combining the bit-mapped image data corresponding to the pattern codes with the residue bit-mapped image data. The regenerated bit-mapped image is stored in a printer memory 26. When the regenerated bit-mapped image is to be printed, the printer memory 26 sends it to a print unit 28 which prints the image.

In the preferred embodiment described herein, the amount of bit-mapped image data that must be transferred along the interface bus 20 is significantly reduced by the recognition of patterns and the use of pattern codes. Since a single pattern code can represent a large amount of individual image point data, the bit-mapped image can be transferred relatively quickly.

The process of identifying patterns in a bit-mapped image is assisted by dividing the bit-mapped image into a plurality of pattern cells. Because of the correspondence between the bit-mapped image and the digital values corresponding to the bit-mapped image, the term pattern cell refers interchangeably to either a subset of the digital values comprising the bit-mapped image or a small area of the image.

Figure 2:
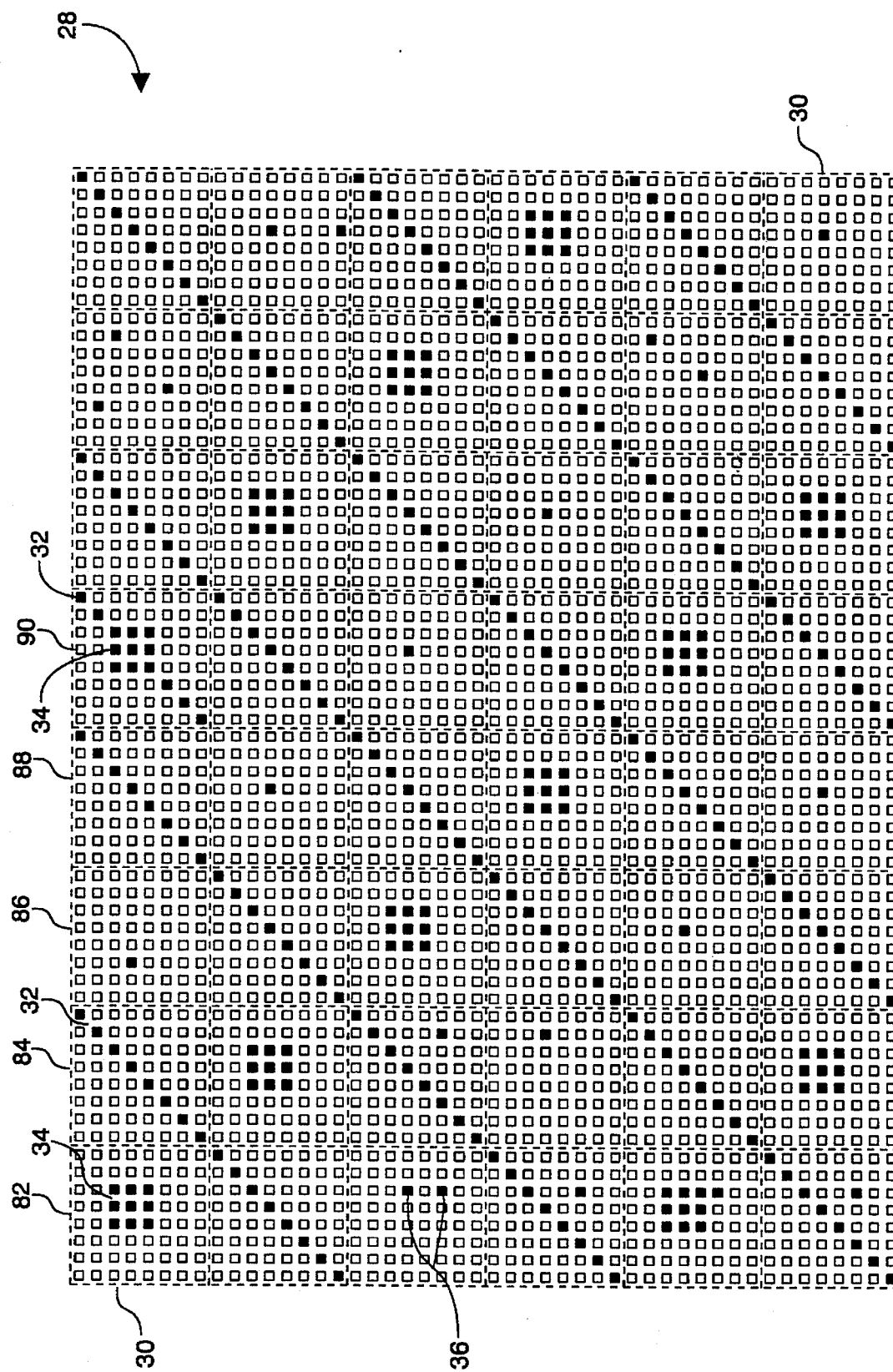
FIG. 2 illustrates the dividing of a bit-mapped image into pattern cells.
Figure 11:
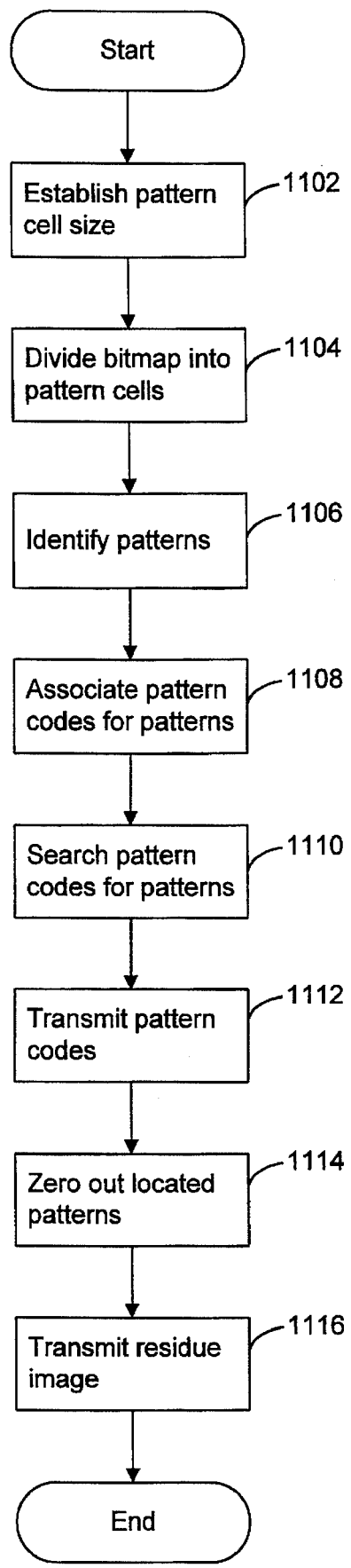
FIG. 11 is a flow diagram of the process of sending the bit-mapped image from the sending device to the receiving device.

Referring now to the bit mapped image of FIG. 2 and the flow diagram of FIG. 11, a pattern cell size is first established in step 102. Then, a bit-mapped image 28 is divided into a large number of pattern cells 30 of the pattern cell size in step 1104. In the preferred embodiment, each pattern cell fills an area comprised of an 8× 8 array of digital values which, in turn, correspond to pels in the bit-mapped image. In FIG. 2, data bits corresponding to digital LOWs are shown as white and data bits corresponding to digital HIGHs are shown as black. It should be specifically noted that pattern cells of different dimensions are possible. A bit-mapped image may be dividable into thousands of individual pattern cells, each of which can be searched for patterns.

The selection of the particular patterns to be recognized depends upon the specific application and desires of the system user or programmer. Since modern printers can be software programmed to recognize different patterns, individual pattern codes can correspond to different patterns in different applications. It is, of course, required that the computer and printer both associate the same patterns with the same font images and pattern codes. Thus, the selected patterns are identified in step 1106 in both the computer and the printer. Then, in step 1108, each selected pattern is associated with a unique pattern code. Since 8-bit bytes are standard in many systems, the preferred embodiment described herein uses byte-sized pattern codes. A single byte can therefore uniquely identify one of 256 possible patterns. While in some applications it may be beneficial to use about 256 patterns, most applications probably will require a much smaller number, such as 50 or 75 patterns.

Once a set of patterns is selected and associated with a set of pattern codes, each pattern cell is searched in step 1110 to determine if it contains a pattern. If a pattern cell contains a pattern, the pattern code value corresponding to that pattern is sent to the printer in step 1112 and the digital values in the bit-mapped image corresponding to that pattern are all set to LOW (zeroed out) in step 1114. After completion of the pattern search, the residue HIGH digital values, which correspond to the portions of the bit-mapped image not recognized as patterns, are also sent to the printer in step 1116.

Figure 3:
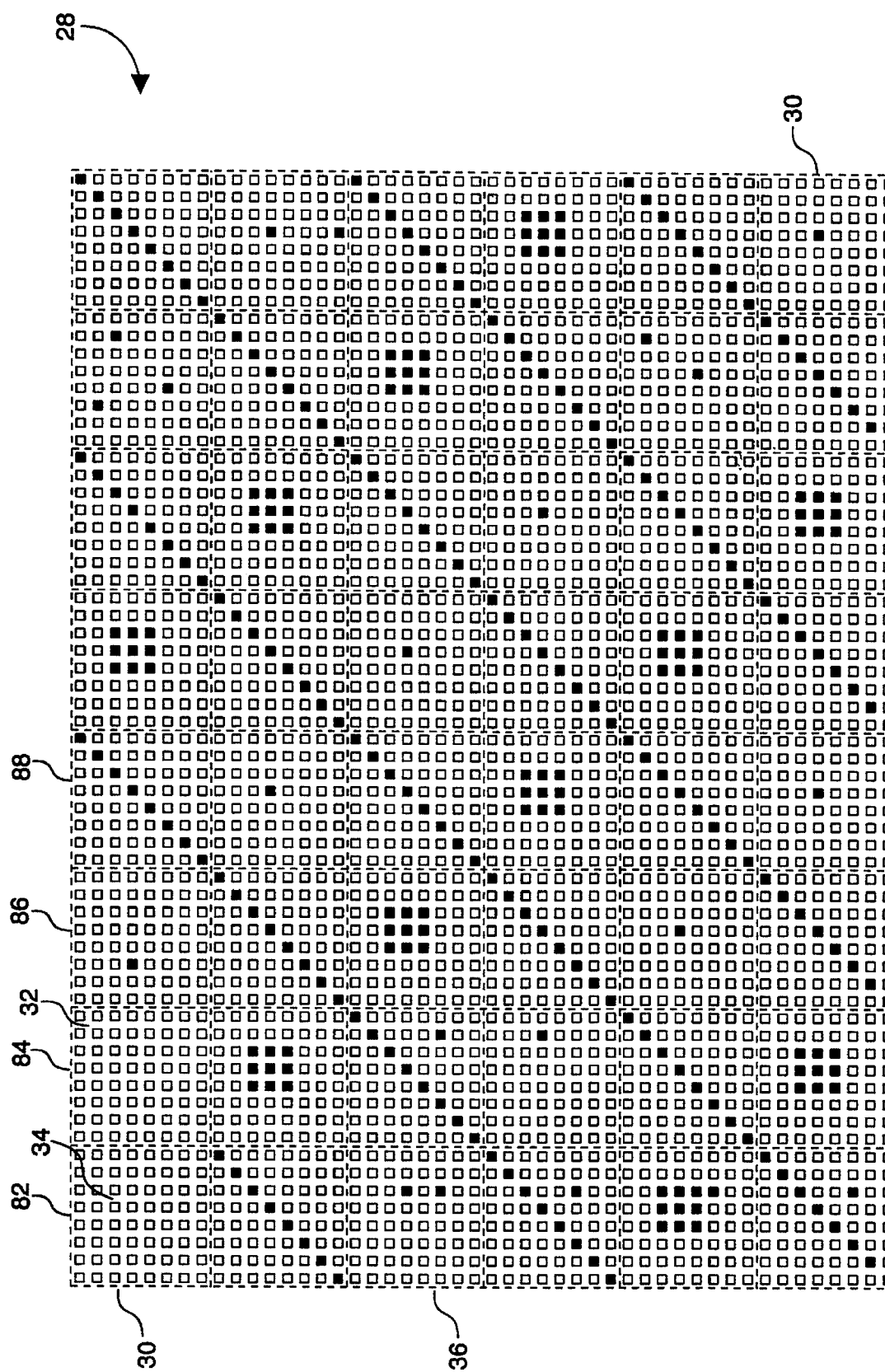
FIG. 3 illustrates the bit-mapped image of FIG. 2 after the patterns in blocks are zeroed out.
Figure 4:
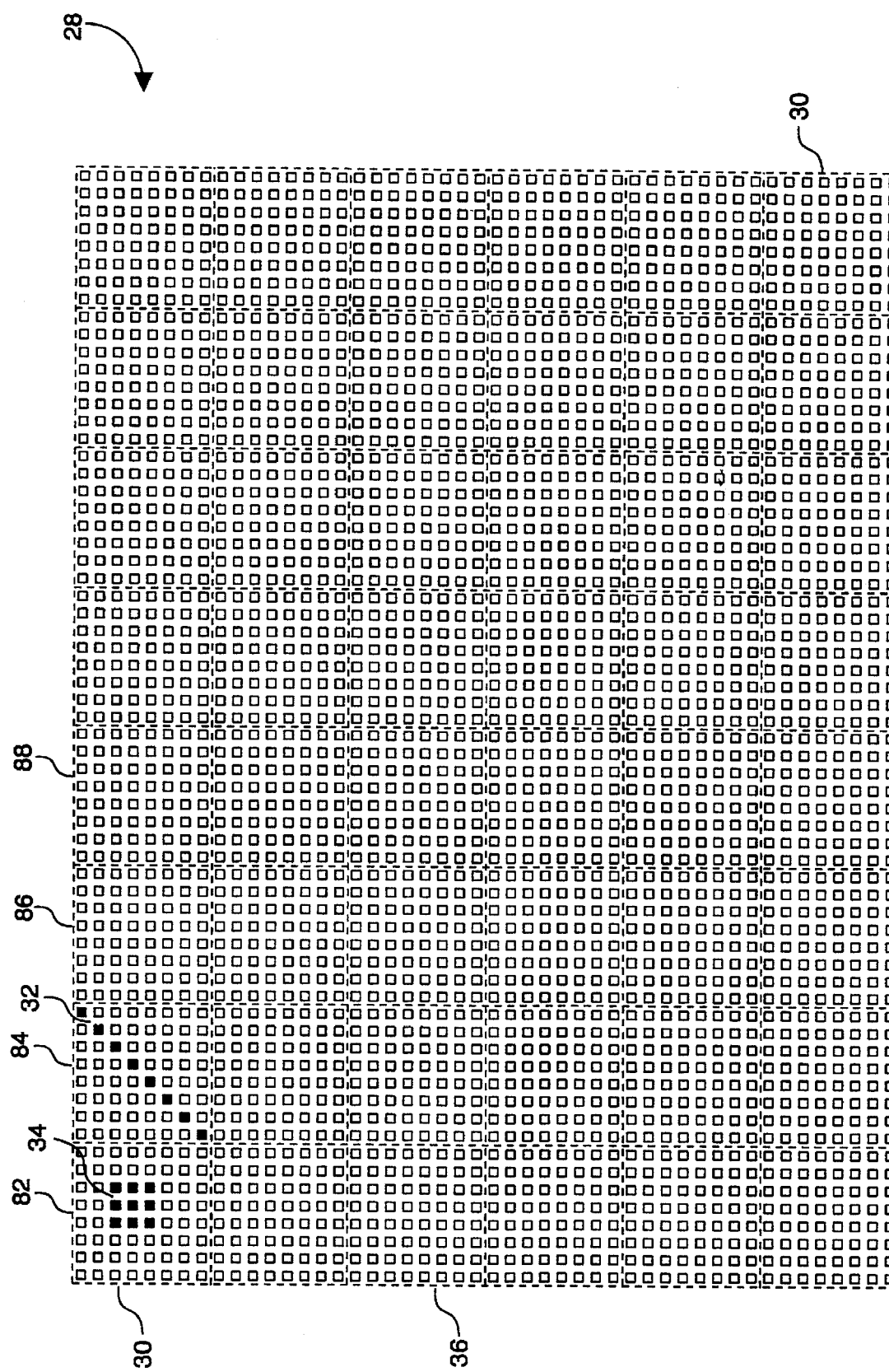
FIG. 4 illustrates the bit-mapped image data in the printer's memory after receipt of the pattern codes corresponding to the patterns in blocks which are zeroed out in FIG. 2.

FIGS. 2, 3 and 4 help illustrate the above. The bit-mapped image 28 of FIG. 2 includes diagonal lines 32, squares 34, and individual dots 36 contained in the pattern cells. Assuming for explanatory purposes that a diagonal line through the center of a pattern cell is recognized as a pattern that is associated with the pattern code 10000001, and that a 3×3 square beginning 4 pel to the right and 3 pels down from the upper left corner of a pattern cell is recognized as a pattern associated with the pattern code 11111110, a search for patterns will find in pattern cell 82 the square pattern. In response, the computer will transmit the pattern code 11111110 to the printer, and preferably will also internally set all of the digital values corresponding to that square to LOW. The zeroing of the bit-mapped image is illustrated in FIG. 3 wherein pattern cell 82 is shown comprised of all LOWs. In response to the received pattern code 11111110, the printer causes digital values corresponding to the square 34 to be stored at a memory location corresponding to pattern cell 82. This is illustrated in FIG. 4 wherein pattern cell 82 is shown as containing a square 34. After pattern cell 82 is completely searched for other patterns, pattern cell 84 is searched. The pattern corresponding to the diagonal line 32 is then located. In response, the computer transmits to the printer the pattern code 10000001 and then zeros out all digital values corresponding to the diagonal line in pattern cell 84, again as shown in FIG. 3. In response to the received pattern code 10000001 the printer stores within its memory digital values corresponding to a diagonal line in memory locations corresponding to pattern cell 84, as shown in FIG. 4.

After pattern cell 84 is searched, the search routine moves to pattern cell 86 of FIG. 2. Since pattern cell 86 does not contain a pattern, the computer transmits to the printer a special empty pattern code, say 11110000, which signals the printer that no pattern is in pattern cell 86. The pattern search continues through each of the pattern cells until the bit-mapped image has been completely searched.

Figure 5:
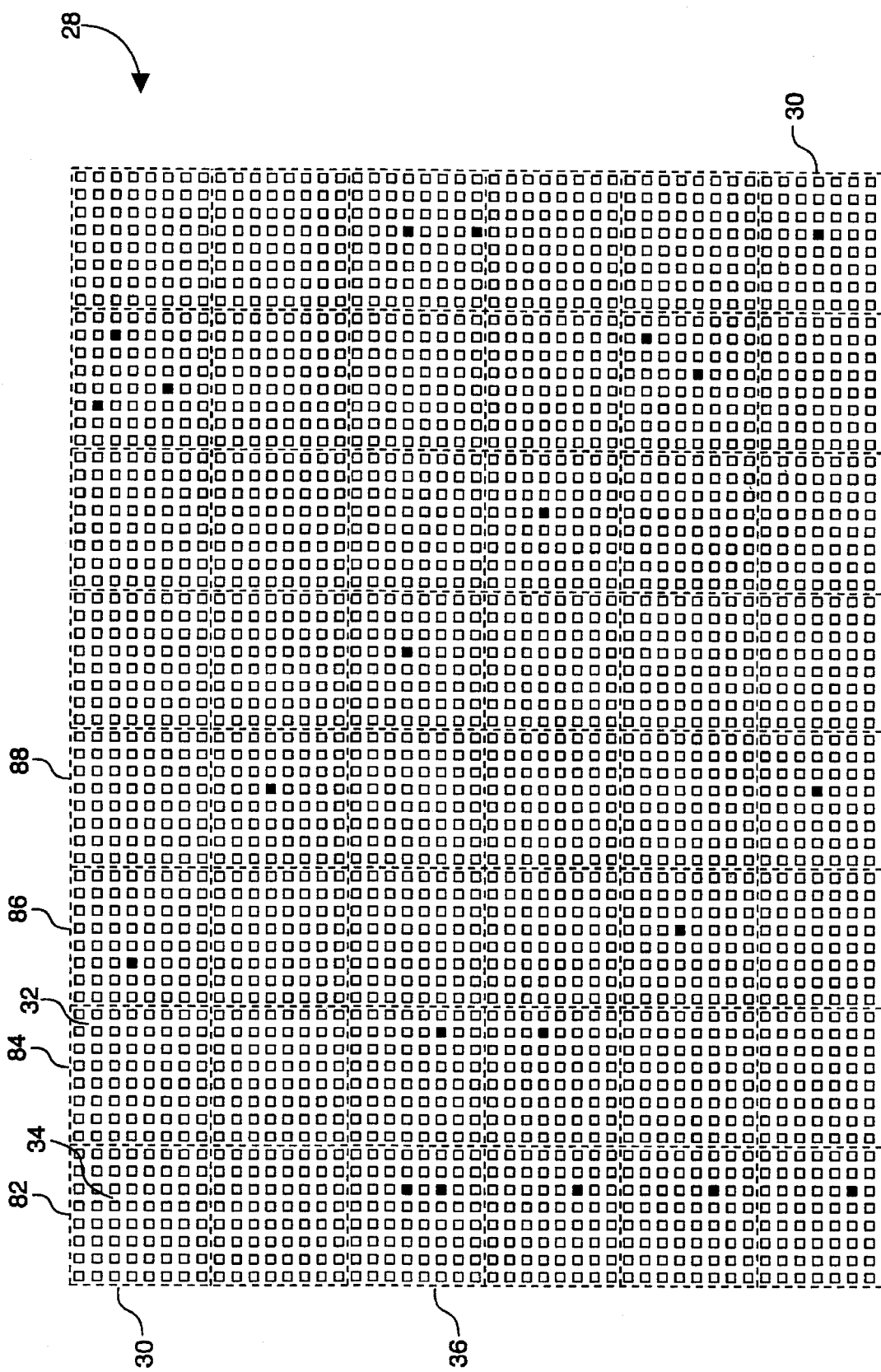
FIG. 5 illustrates the residue data of FIG. 2 after all patterns have been zeroed out.
Figure 6:
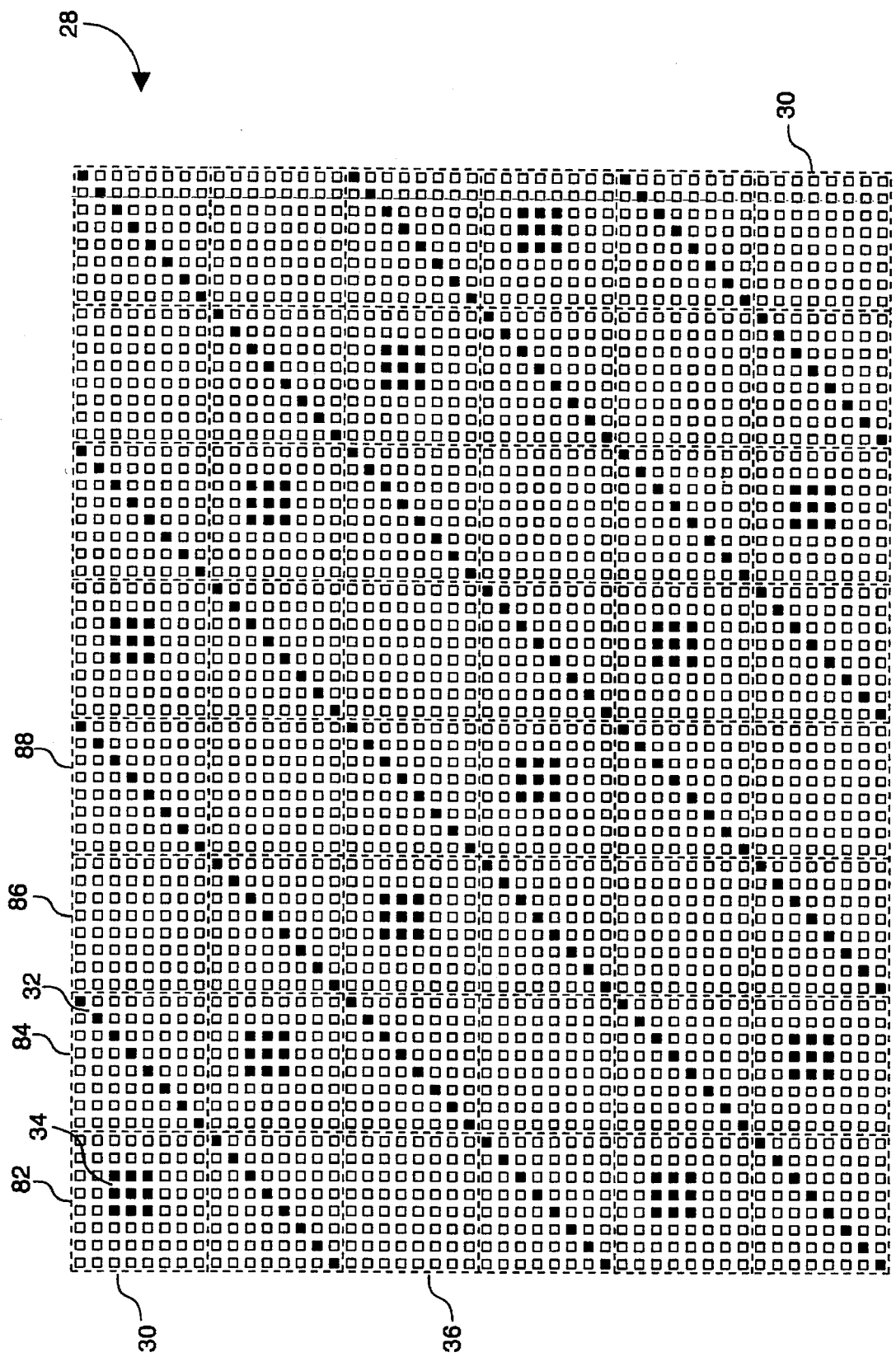
FIG. 6 illustrates the contents of the printer's memory after all pattern codes corresponding to the patterns of FIG. 2 have been received.

After all of the pattern cells are searched and after all patterns are zeroed out, the bit-mapped memory contains the residue shown in FIG. 5. FIG. 6 shows the contents of the printer memory after receipt of all of the pattern codes. At this time, the residue of FIG. 5 could be transmitted to the printer byte-by-byte. However, by taking advantage of the large "white" spaces remaining after the patterns are zeroed out, and by using the capability of modern printers to skip those large "white" areas, the residue bit-mapped data can be transferred to the printer quickly. It is, of course, important that the residue data be combined with the pattern transmitted portions of the bit-mapped image so that all of the image points are in their original relative positions.

For clarity, the above description describes patterns as being zeroed out and pattern codes as being transmitted to the printer immediately after patterns are identified in the pattern cells. However, in preferred embodiments, the pattern codes may be stored as part of a text string which is not transmitted to the printer until the pattern search is completed and the patterns are not zeroed out until the text string is sent to the printer. By delaying font character code transmittal until the text string is complete, the command language overhead required for the printer can be reduced by making use of the automatic resetting features of most printers; thus, the pattern codes can be transmitted more quickly.

Recognition of the patterns within the pattern cells is described with reference to FIG. 12, which corresponds to the searching step 1110 and the transmitting step 1112 of FIG. 11. While various methods may be used to recognize the patterns within the pattern cells, the preferred embodiment described herein uses a hashing function and hash tables. The best hashing function to use depends upon the particular application and the specific patterns to be recognized. In the preferred embodiment described herein, each pattern cell pel is assigned in step 1202 of FIG. 12 a unique numerical value when it is HIGH, and zero when it is LOW. When a pattern cell is searched for patterns, the numerical values for the HIGH pels are applied in step 1204 of FIG. 12 as inputs to a hashing function which outputs a number. For simplicity, the range of possible outcomes from the hashing function is discussed herein as being equal to the number of patterns used in the particular application. However, as is well-known in the art, the output of hashing functions need not be uniquely defined. Even a relatively small pattern cell, such as the 8×8 pel array used in a preferred embodiment, will produce a large number of possible combinations of pel values. For example, the preferred embodiment 8×8 pel array can be organized into 264 different combinations. When these various combinations are applied to the hashing function, a large number of different pel combinations will usually produce the same output. Therefore, the preferred embodiment system checks the contents of the pattern cell against the pattern associated with that hashing function outcome to ensure that the particular pattern is indeed present in the pattern cell. Although, in the preferred embodiment, the hashing table is finite and corresponds to a predetermined set of patterns, it should be noted that a dynamic hash table could be implemented by which new and frequently used patterns can be referenced.

Figure 8:
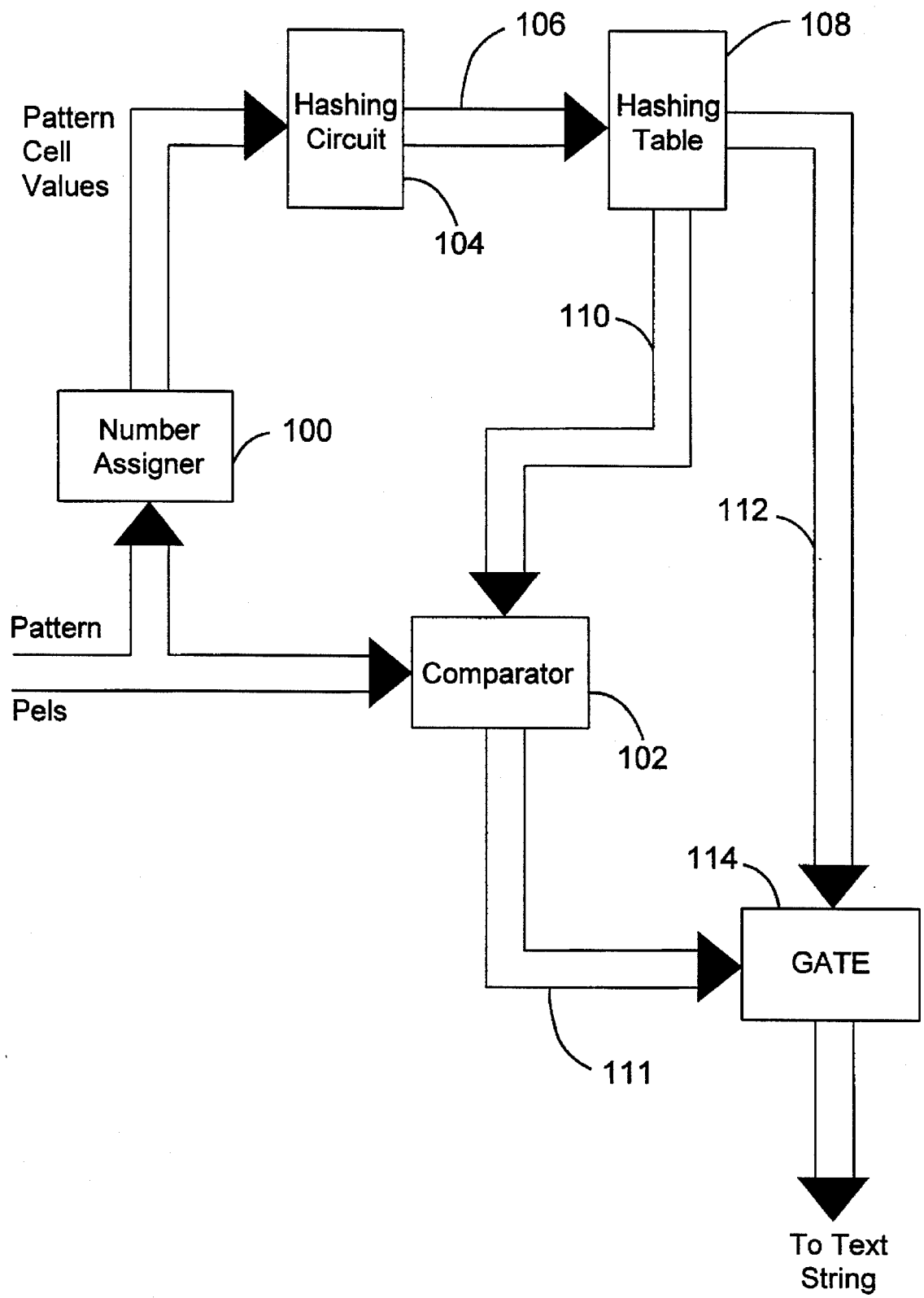
FIG. 8 shows the method of checking the hash function output with an associated pattern used in the preferred embodiment described herein.
Figure 12:
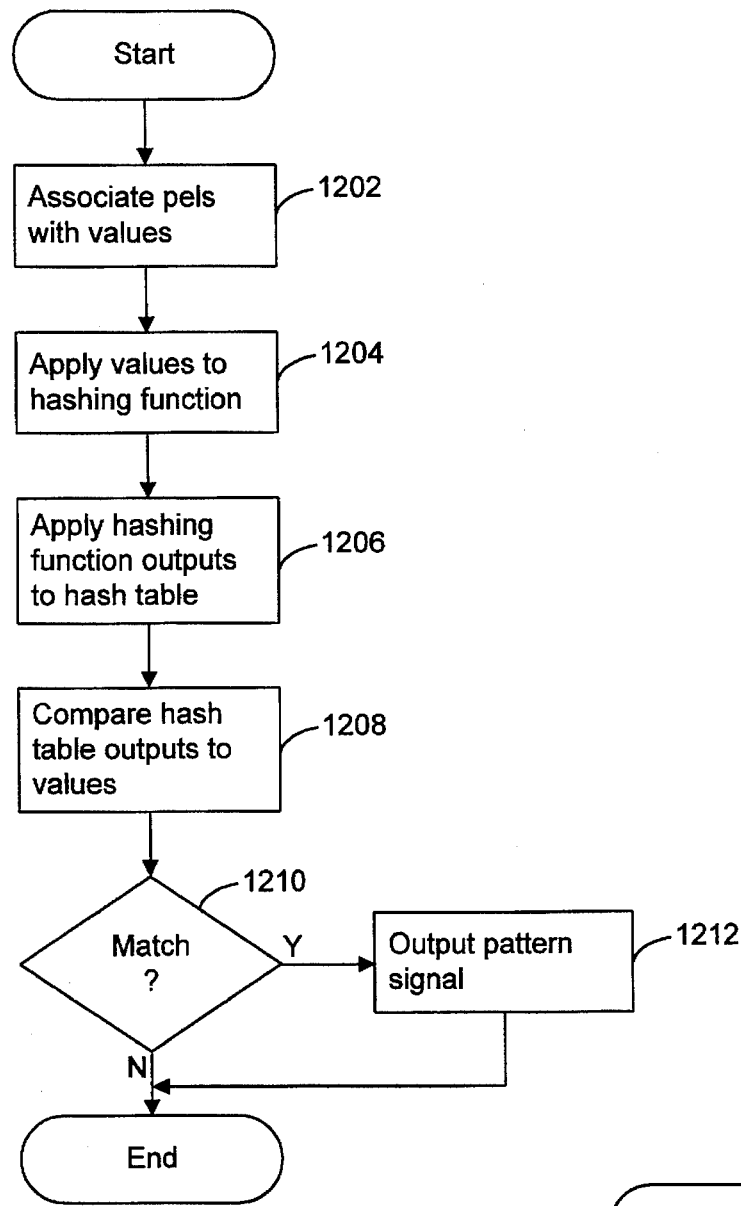
FIG. 12 is a flow diagram of the process of searching the pattern cells for patterns.
Figure 13:
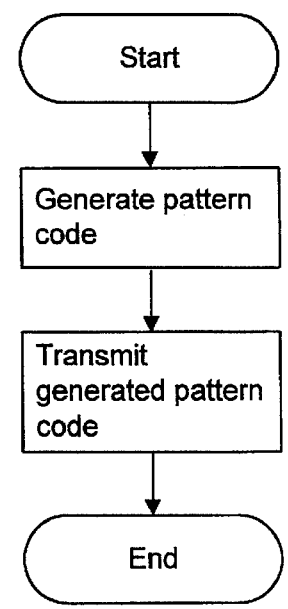
FIG. 13 is a flow diagram of the process of transmitting the pattern codes.

To check that the pattern cell contains the pattern associated with the hashing function output, the pel values of a pattern cell are applied in step 1206 of FIG. 12 as inputs to a hash table. In response to these inputs, the hash table outputs a vector of digital values having entries which correspond to the pel values of the pattern associated with the hashing table outcome. For example, referring to FIG. 7 each pel is assigned a sequential number between 1 and 64. The HIGH pels for the square 34 of FIG. 2 are those within the block 60. Those pels are assigned values of 20, 21, 22, 28, 29, 30, 36, 37 and 38. Referring now to FIG. 8, the digital values of the pels of the array are applied to both a number assignor 100, which assigns the values of FIG. 7 to the pels, i.e., the numbers 20–22, 28–30 and 36–38, and to a comparator 102. The number assignor outputs are applied to the hashing circuit 104 which produces a hashing function output on a bus 106. The hashing function output is applied as the input to a hash table 108 which outputs a pattern cell vector having 64 entries, one for each pel, on bus 110. The logic states of the vector entries correspond to the digital values of the pattern associated with the hash function output on bus 106. The hash table vector entries are applied to the comparator 102. The comparator compares in step 1208 of FIG. 12 the vector entries with the logic states of the pel data values, determines whether they are the same in step 1210 and outputs in step 1212 a logic HIGH on a line 111 as a pattern signal indicating the pattern cell contains the pattern associated with the hashing function. The hash table 108 also outputs in step 1302 of FIG. 13 on a bus 112 the pattern code for the pattern associated with the hashing function output to a gate 114 which also connects to the line 111. If the comparator outputs a HIGH, the pattern code on bus 112 is stored in the text string. If, however, the output of the comparator is LOW, indicating that the pattern cell does not contain the proper pattern, the pattern code is not added to the text string and the next pattern is searched for. If a pattern cell contains no patterns the empty pattern code 11110000 is added to the text string.

The pattern codes are transmitted by transmitting in step 1304 the text string produced above to the printer 23. In the preferred embodiment described herein, the text string resulting from the above action is modified to further speed the transfer of the bit-mapped image data. As mentioned, if a pattern is not recognized in a pattern cell the empty pattern is added in the text string. Patterns may not be found in several adjacent pattern cells; sequences of empty patterns in the text string then result. This condition is shown in FIG. 9 wherein text string entries are shown as an array of pattern codes which correspond to pattern cells of a bit-mapped image. In FIG. 9, entries labeled 14, 15, 16, and 17 represent decimal equivalents of pattern codes of identified patterns while 0 represents the empty font character code. Specifically, note that FIG. 9 shows adjacent text entries of empty patterns in rows 3, 4, and 5. Each empty font character code corresponds to a step over a pattern cell. The preferred embodiment system scans the text string and assigns a reserved pattern code, say 00000001, or simply 1, to indicate two adjacent empty patterns. Additionally, the preferred method assigns another special font character code, say font character code 00000010 or simply 2, if four adjacent empty patterns occur, as shown in row 4 of FIG. 9. Thus, six successive empty patterns can be represented by adjacent pattern codes of 1 and 2. Of course, other special patterns could represent other numbers of adjacent empty patterns and other methods of designating adjacent empty patterns can also be used.

The preceding process reduces the text string of FIG. 9 to that shown in FIG. 10. Rows 1 and 2 of FIG. 10 are identical to rows 1 and 2, respectively, of FIG. 9. However, row 3 of FIG. 10 has a reduced text string formed by replacing the two sequential empty pattern codes with a pattern code one (1). In row 4 of FIG. 10, a pattern code of 2 replaces the four sequential empty pattern codes of FIG. 9. Finally, in row 5 of FIG. 10, a pattern code of 2 followed by a pattern code of 1 causes the printer to skip over the 6 consecutive pattern cells represented by empty pattern codes, as shown in FIG. 9. By the use of special reserved character codes to denote jumps over pattern cells, the text string of FIG. 9, comprised of 35 pattern codes, can be reduced to the text string comprised of only 27 pattern codes as shown in FIG. 10.

It should be noted that, since the transmitted pattern codes take on the same format and meaning as character codes, all features available for printing text characters become available for printing the patterns.

It is to be understood that even though numerous advantages of the present invention have been set forth in the foregoing description, the above disclosure is illustrative only. Changes may be made in detail and yet remain within the broad principles of the present invention. Therefore, the present invention is to be limited only by the appended claims.

I claim:

1. A method of sending a bit-mapped image from a sending device to a receiving device, comprising the steps of:

identifying in both the sending and receiving devices a set of patterns each comprised of a set of image data values representing pels;

associating a pattern code with each pattern;

dividing the bit-mapped image into a plurality of pattern cells immediately adjacent each other, each pattern cell including an array of pels represented by image data values and being dimensioned to encompass the patterns;

searching said bit-mapped image for pattern cells having image data values matching the image data values of said patterns, wherein said step of searching the bit-mapped image includes the steps of:

associating numerical values with the image data values in a current pattern cell being searched, wherein each of the numerical values depends upon a logic state of an associated image data value of the current pattern cell;

applying the numerical values of the image data values in the current pattern cell being searched as inputs to hashing function which produces a hashing function output;

accessing a hash table entry corresponding to the hashing function output, the hash table entry indicating one of the preselected patterns;

comparing the image data values of the current pattern cell with the image data values of the preselected pattern indicated by the hash table entry; and outputting a pattern signal if the image data values of the preselected pattern indicated by the hash table entry match the image data values of the current pattern cell being searched;

for each pattern cell that matches one of said patterns, zeroing the image data values of the pattern cell, wherein the zeroed image data values of the matching pattern cells and the image data values of the pattern cells that do not match one of said patterns form a residual image without including the pattern codes associated with the matched patterns;

compressing the residual image;

for each pattern cell that matches one of said patterns, appending to a text string the pattern code associated with the matched pattern, wherein the step of appending the pattern code includes the steps of:

generating the pattern code associated with the preselected pattern indicated bay the hash table entry; and transmitting the generated pattern code in response to the pattern signal being output;

for each pattern cell that does not match one of said patterns, appending to the text string a special code that indicates that the pattern cell does not match one of said patterns;

transmitting the compressed residual image to said receiving device; and transmitting the text string to said receiving device separately from the compressed residual image.

2. The method according to claim 1 wherein the dividing step includes dividing the bit-mapped image into a plurality of pattern cells of equal size.

3. The method according to claim 1 wherein the dividing step includes dividing the bit-mapped image into a plurality of rectangular pattern cells.

4. The method of claim 1, wherein the special code appending to the text string is an empty pattern code.

* * * * *

UNITED STATES PATENT AND TRADEMARK OFFICE
CERTIFICATE OF CORRECTION

PATENT NO.     :   5,640,607
DATED          :   June 17, 1997
INVENTOR(S)    :   Ronald C. Murray It is certified that error appears in the above identified patent and that said Letters Patent is hereby corrected as shown below:

In column 8, claim 1, line 35, following the word "to", please insert --a--.

In column 8, claim 1, line 61, please delete the word "bay" and insert therefore --by--.

Signed and Sealed this

Twenty-fourth Day of February, 1998

Attest:

BRUCE LEHMAN

Attesting Officer     Commissioner of Patents and Trademarks